F. W. RANDALL.
Improvement in Devices for Securing Horse-Powers.
No. 114,853. Patented May 16, 1871.
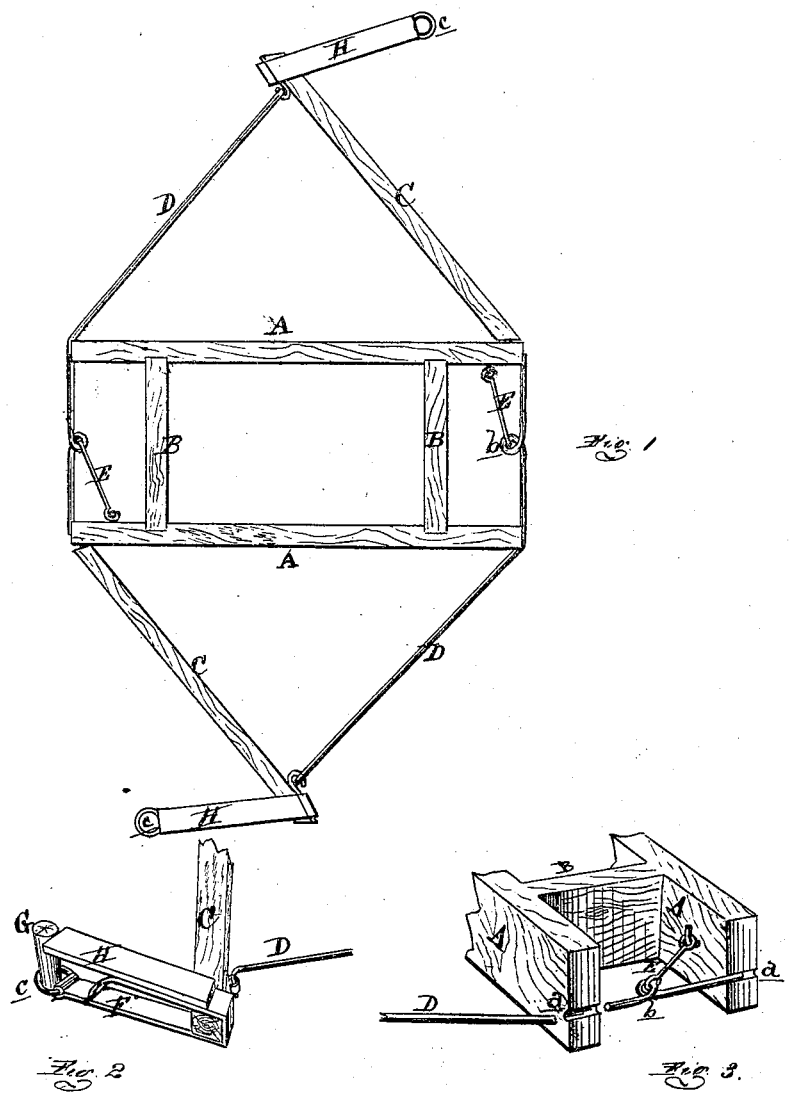

United States Patent Office.

FRANCIS W. RANDALL, OF BURLINGTON, ASSIGNOR TO GEORGE W. WHITE, OF GRASS LAKE, MICHIGAN.

Letters Patent No. 114,853, dated May 16, 1871.

IMPROVEMENT IN DEVICES FOR SECURING HORSE-POWERS.

The Schedule referred to in these Letters Patent and making part of the same.

*To whom it may concern:*

Be it known that I, FRANCIS W. RANDALL, of Burlington, in the county of Calhoun and State of Michigan, have invented a new and useful Improvement in Mode of Securing Horse-Powers to the Ground; and I do declare that the following is a true and accurate description thereof, reference being had to the accompanying drawing and to the letters of reference marked thereon and being a part of this specification, in which—

Figure 1 is a plan view of an ordinary horse-power frame and my fastening arrangements connected therewith.

Figure 2 is a detached view in perspective of my device for securing the stays to the stake.

Figure 3 is a sectional perspective of my arrangement for holding the frame down and preventing the ends thereof from tilting up.

Like letters indicate like parts in each figure.

The nature of this invention relates to improvements in the mode of securing horse-powers to the ground, and is designed more particularly to partially counteract the torsional strain upon the frame produced by the leverage of the sweeps, to prevent the stakes from being loosened in the ground and the ends of the frame from tilting, as is usual with frames of horse-powers secured by any of the methods now in use.

The invention consists—

First, in a peculiar link and brace, by means of which the outer ends of the stays are secured to the stakes, and which prevents the latter from becoming loosened in the ground from the strain upon them.

Second, in an ingenious arrangement of stay-rods, which connect the outer ends of the stays with the ends of the frame in such a manner as to entirely prevent the latter from tilting up.

Third, in a general combination of the various parts, as more fully hereinafter described.

In the accompanying drawing—

A represents the sides, and
B the girts of an ordinary horse-power frame; and
C and D exhibit, respectively, stays and stay-rods, in pairs, on each side of the frame.

The inner ends of the stays C are beveled off at an angle of about thirty degrees, so that they will rest against the sides A, to which they are secured in any convenient manner so that they may be readily removed at will.

To or near the outer ends of the stays C are hooked or otherwise secured the stay-rods D, and the opposite ends of said stay-rods rest in grooves *a*, in the ends of the sides A, and are secured in said grooves by the hooks E, one end of which is pivoted to the sides of the frame, while the other end is secured to eye *b*, in the stay-rod, or in any other convenient manner.

A link, F, is suitably secured upon the outer end of each of the stays C, and the outer ends of these links are provided with rings *c*, through which the stakes G are driven into the ground.

To the top of these links are secured the braces H, the outer end of which is intended to rest against the upper ends of the stakes and prevent their being loosened in the ground by the strain brought to bear upon them by the links when the horse-power is in operation.

I am aware of the device patented by William H. Buel on the 6th day of October, 1868, and claim no portion thereof; but

What I claim as my invention, and desire to secure by Letters Patent, is—

1. The link F and brace H, when constructed substantially as described, in connection with the stays C and stakes G, for the purposes set forth.

2. The stay-rods D, in connection with the sides A and stays C, substantially as described, when the former are held in their engagement with the grooves *a* by means of the hooks E, for the purposes set forth.

3. The device for securing horse-powers to the ground, wherein the stays C, stay-rods D, hooks E, links F, rings *c*, stakes G, and braces H are arranged relative to each other and to the sides A of the frame, substantially as and for the purposes set forth.

FRANCIS W. RANDALL.

Witnesses.
 JNO. ANDERSON,
 H. H. FORD.